(12) United States Patent
Jung et al.

(10) Patent No.: US 12,452,977 B2
(45) Date of Patent: Oct. 21, 2025

(54) LIGHT SOURCE DRIVING APPARATUS

(71) Applicant: LG INNOTEK CO., LTD., Seoul (KR)

(72) Inventors: Seung Tae Jung, Seoul (KR); Jae Hyun Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 193 days.

(21) Appl. No.: 18/037,418

(22) PCT Filed: Dec. 1, 2021

(86) PCT No.: PCT/KR2021/017984
§ 371 (c)(1),
(2) Date: May 17, 2023

(87) PCT Pub. No.: WO2022/119306
PCT Pub. Date: Jun. 9, 2022

(65) Prior Publication Data
US 2023/0422374 A1  Dec. 28, 2023

(30) Foreign Application Priority Data

Dec. 1, 2020  (KR) .................. 10-2020-0165785

(51) Int. Cl.
*H05B 45/30* (2020.01)
*H05B 45/345* (2020.01)
*H05B 45/50* (2022.01)

(52) U.S. Cl.
CPC ........... *H05B 45/50* (2020.01); *H05B 45/345* (2020.01)

(58) Field of Classification Search
CPC ...... H05B 45/10; H05B 45/30; H05B 45/345; H05B 45/50; H05B 47/10
See application file for complete search history.

(56) References Cited

U.S. PATENT DOCUMENTS 8,461,777 B1  6/2013  Mednik et al.
9,320,107 B2  4/2016  Takeshi et al.
(Continued)

FOREIGN PATENT DOCUMENTS

JP  2015-110357  6/2015
JP  2018-195503  12/2018
(Continued)

OTHER PUBLICATIONS

International Search Report dated Mar. 25, 2022 issued in Application No. PCT/KR2021/017984.
(Continued)

*Primary Examiner* — Jimmy T Vu
(74) *Attorney, Agent, or Firm* — KED & ASSOCIATES, LLP

(57) ABSTRACT

A light source driving apparatus according to an embodiment includes a light source part; a constant current driving part connected to the light source part, including a first switching device, and supplying a constant current to the light source part according to a switching operation of the first switching device; a driving control part outputting a switching signal for controlling the first switching device consisting the constant current driving part; an abnormal state sensing part sensing an abnormal state of the light source part and an abnormal state of the driving control part, and outputting a control signal according to a result of the sensing; and a protective circuit part selectively operating based on the control signal output from the abnormal state sensing part to stop an operation of the constant current driving part and an operation of the light source part.

15 Claims, 11 Drawing Sheets

(56) References Cited

U.S. PATENT DOCUMENTS

| | | | |
|---|---|---|---|
| 2013/0147355 A1 | 6/2013 | Min et al. | |
| 2013/0313973 A1* | 11/2013 | DeNicholas | H05B 45/10 |
| | | | 307/115 |
| 2015/0163871 A1 | 6/2015 | Takeshi et al. | |
| 2016/0309554 A1 | 10/2016 | Kang | |
| 2018/0146523 A1* | 5/2018 | Nakatani | H05B 45/54 |

FOREIGN PATENT DOCUMENTS

| | | |
|---|---|---|
| KR | 10-1003072 | 12/2010 |
| KR | 10-2012-0118992 | 10/2012 |
| KR | 10-2013-0063863 | 6/2013 |
| KR | 10-2016-0124587 | 10/2016 |
| KR | 10-2016-0126526 | 11/2016 |
| KR | 10-2019-0006804 | 1/2019 |
| KR | 10-2165446 | 10/2020 |

OTHER PUBLICATIONS

European Search Report dated Sep. 27, 2024 issued in Application No. 21900994.1.
Korean Office Action dated Dec. 16, 2024 issued in Application No. 10-2020-0165785.
Japanese Office Action dated Jul. 8, 2025, issued in Application No. 2023-530642.

* cited by examiner

[FIG. 1]
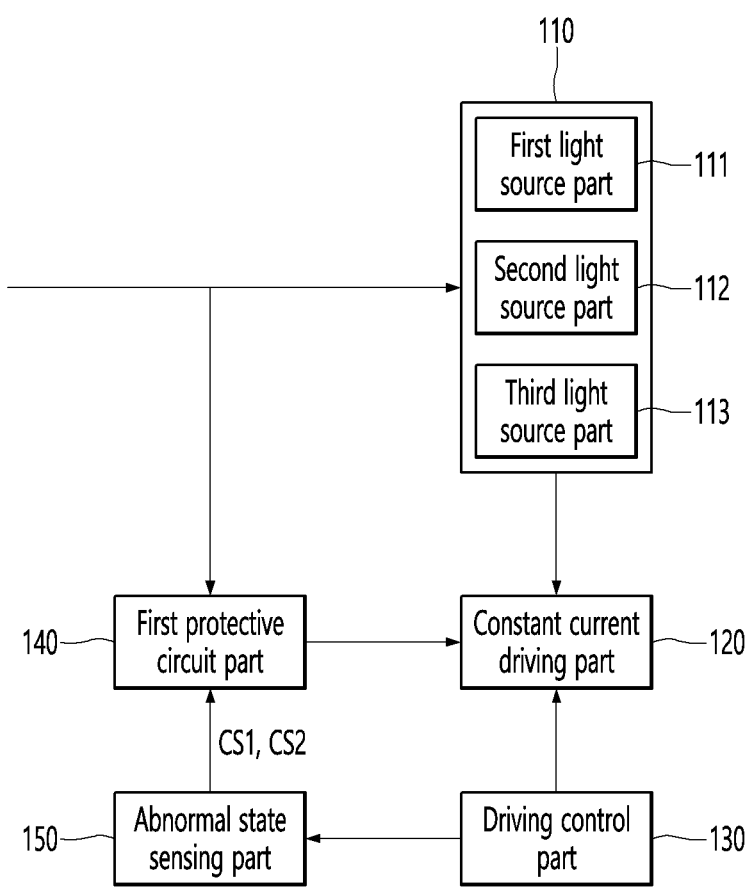

【FIG. 2】
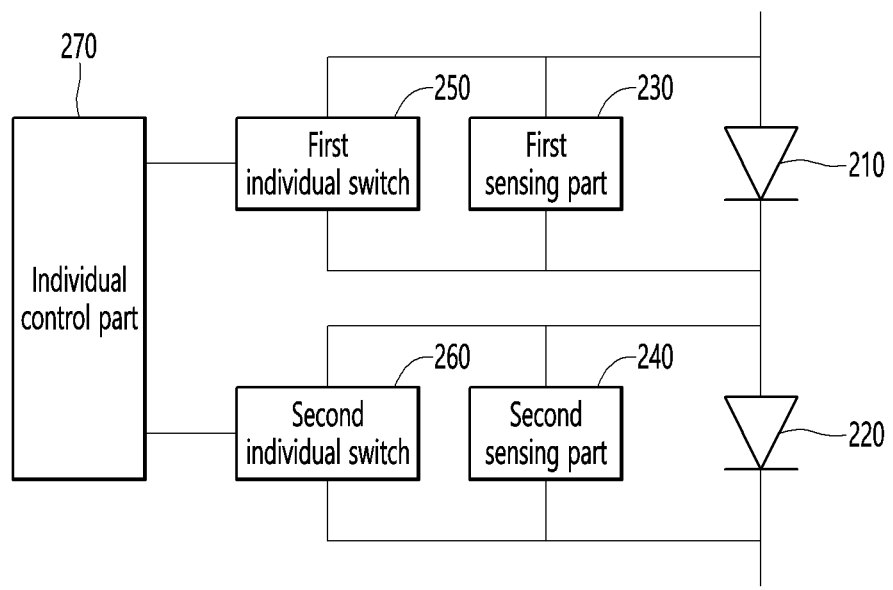

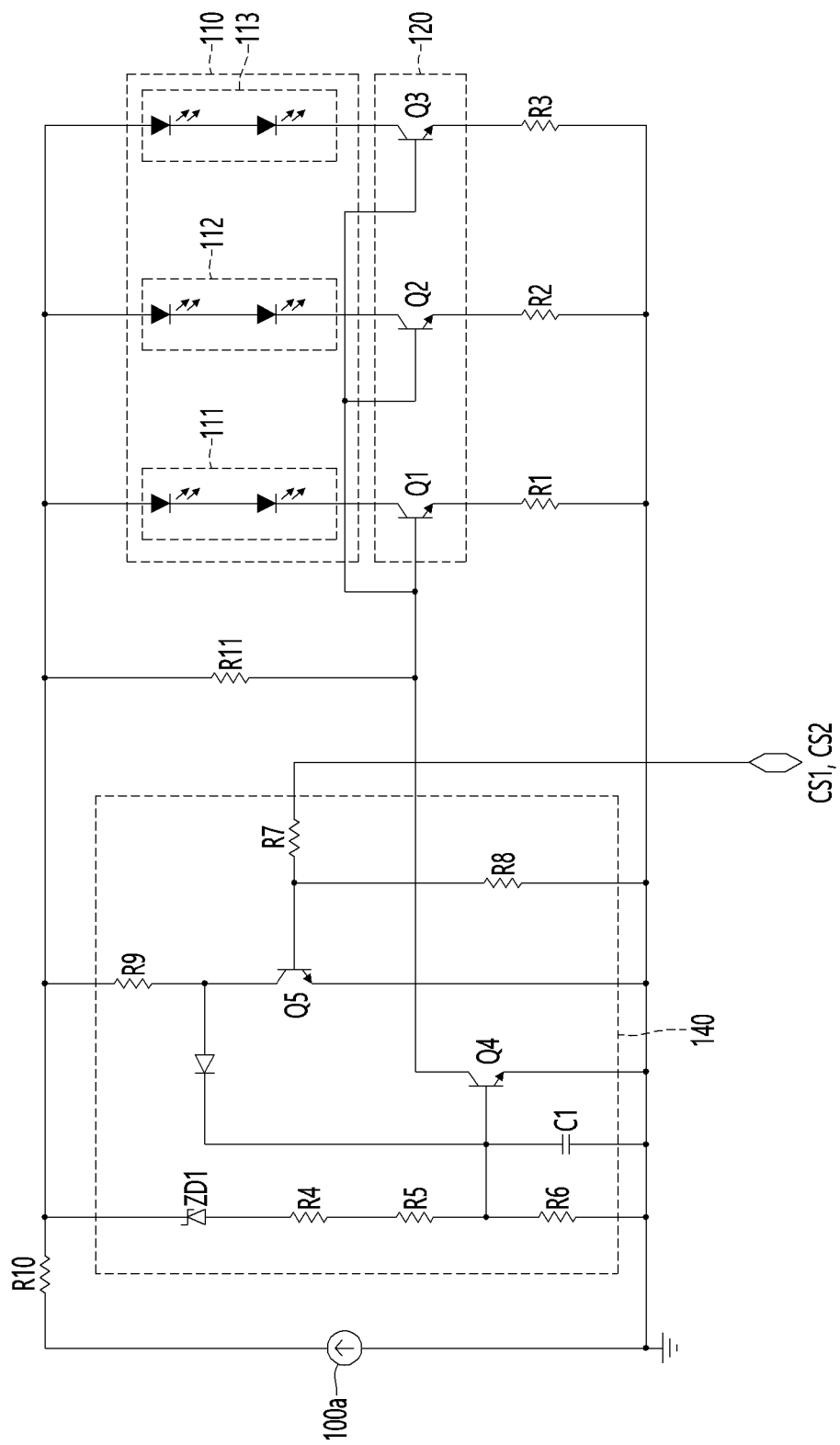
[FIG. 3]

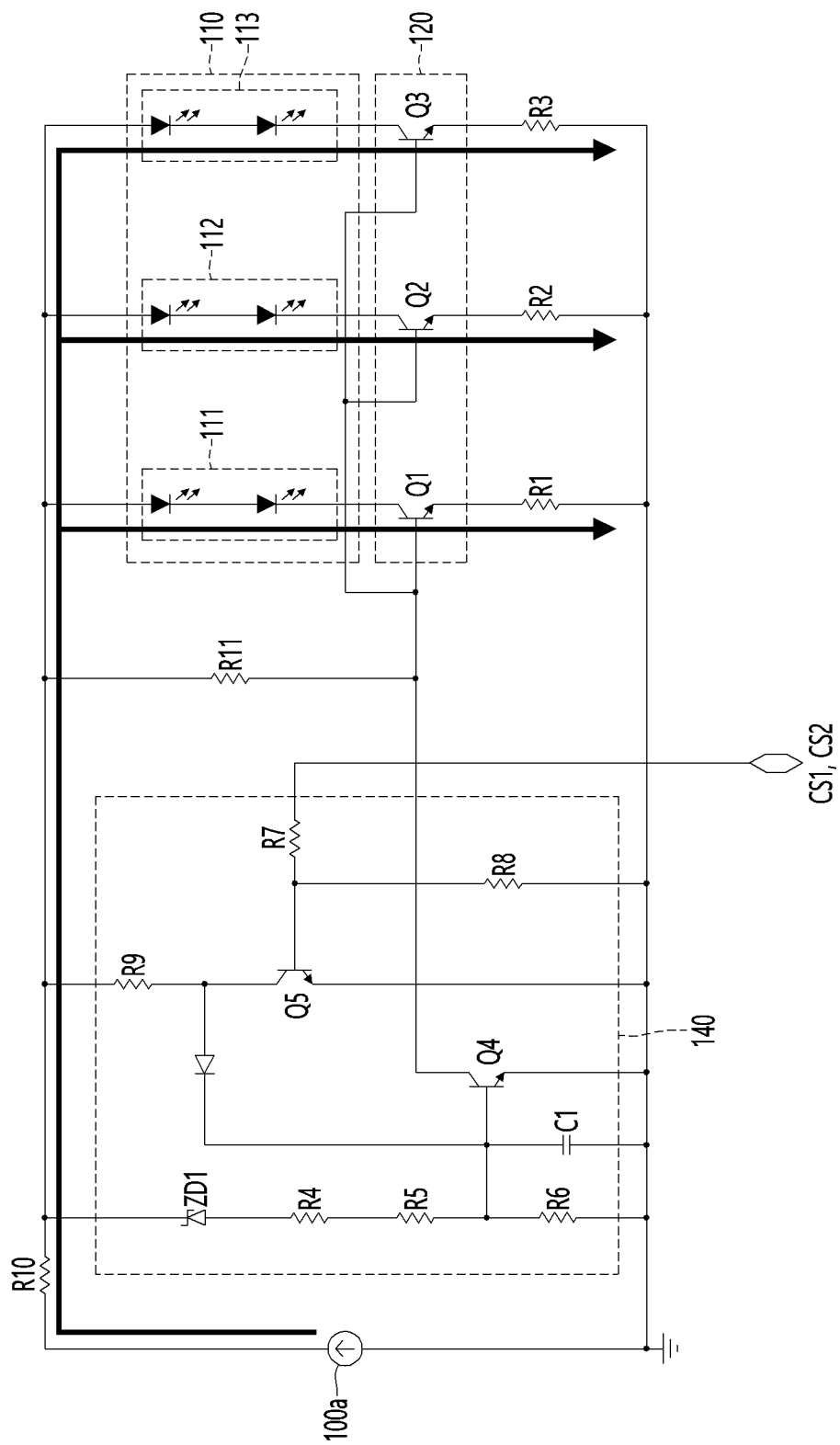
[FIG. 4]

[FIG. 5]
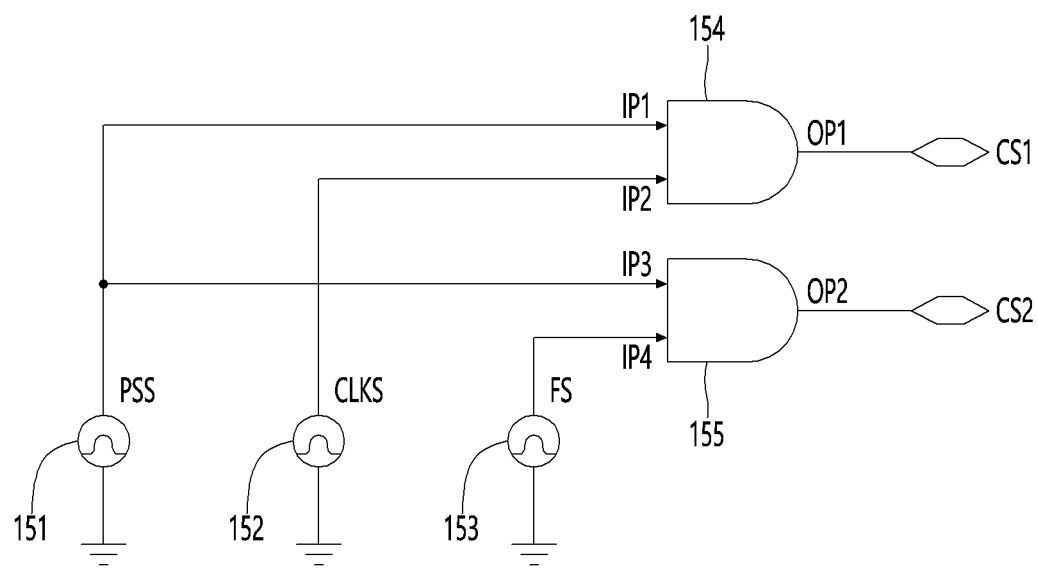

[FIG. 6]
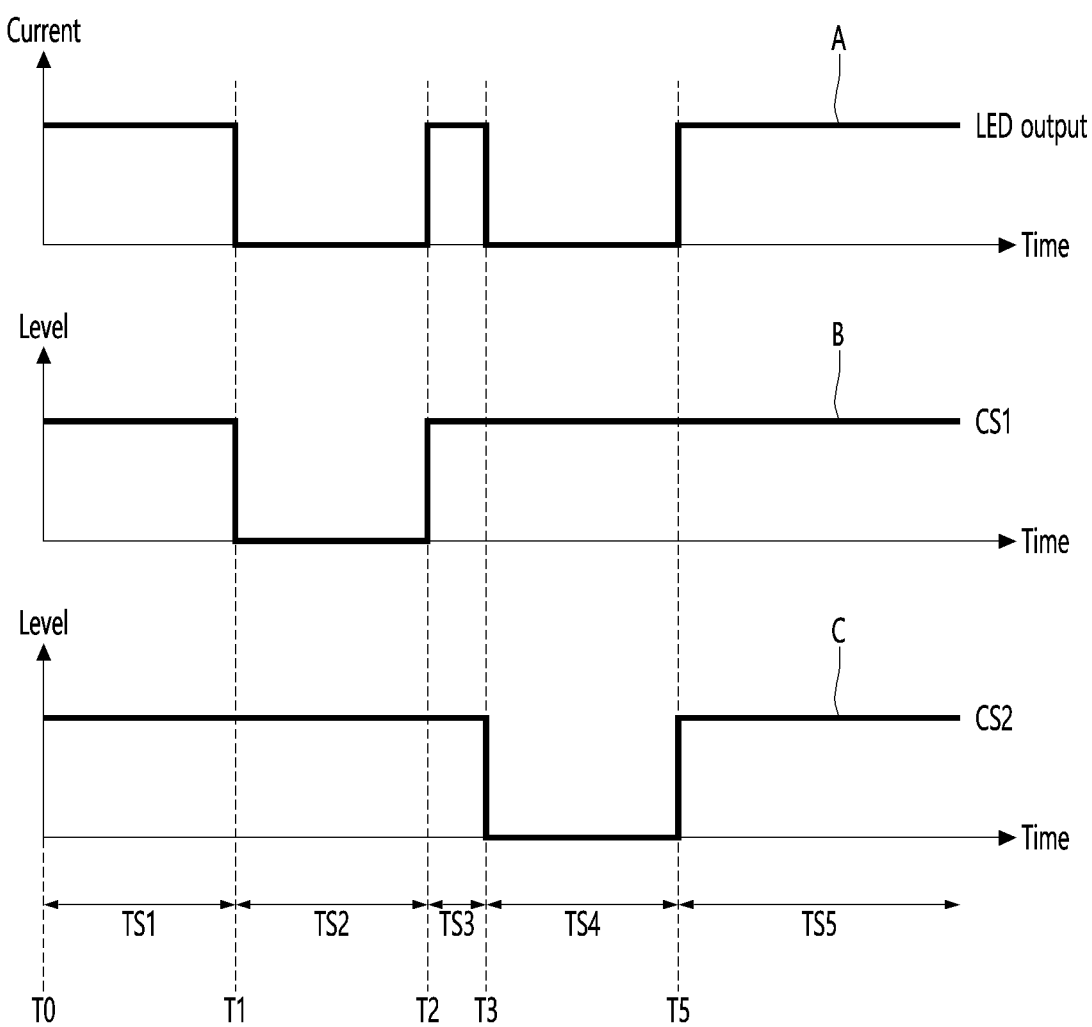

[FIG. 7]
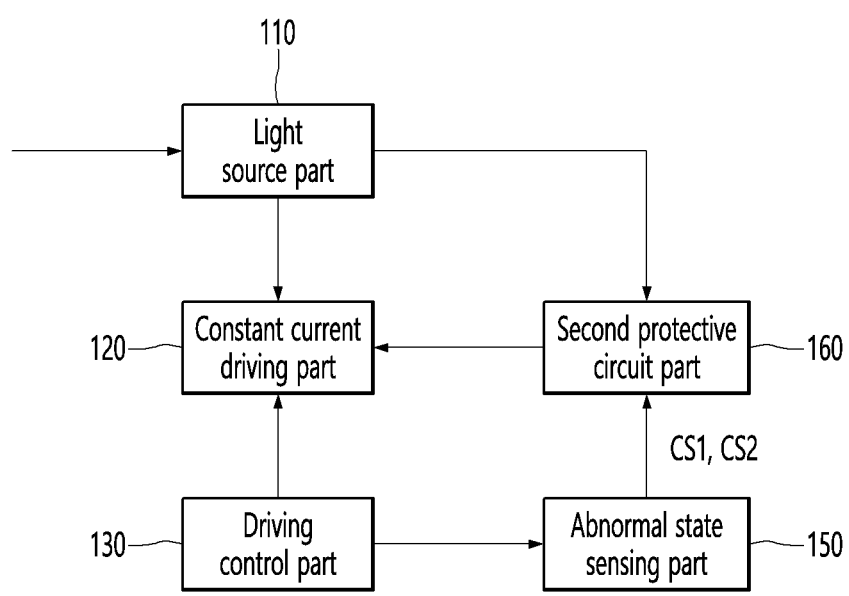

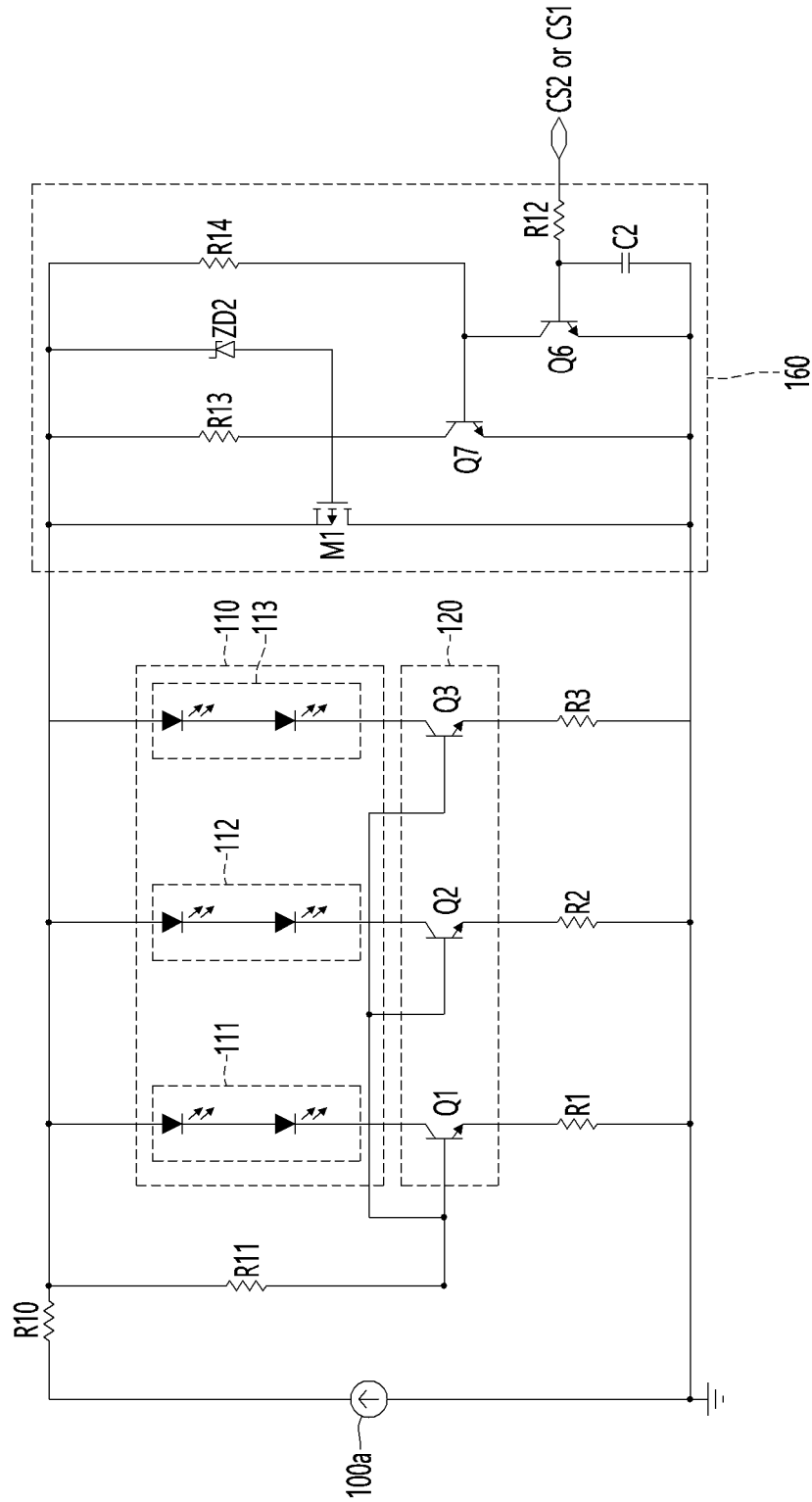
[FIG. 8]

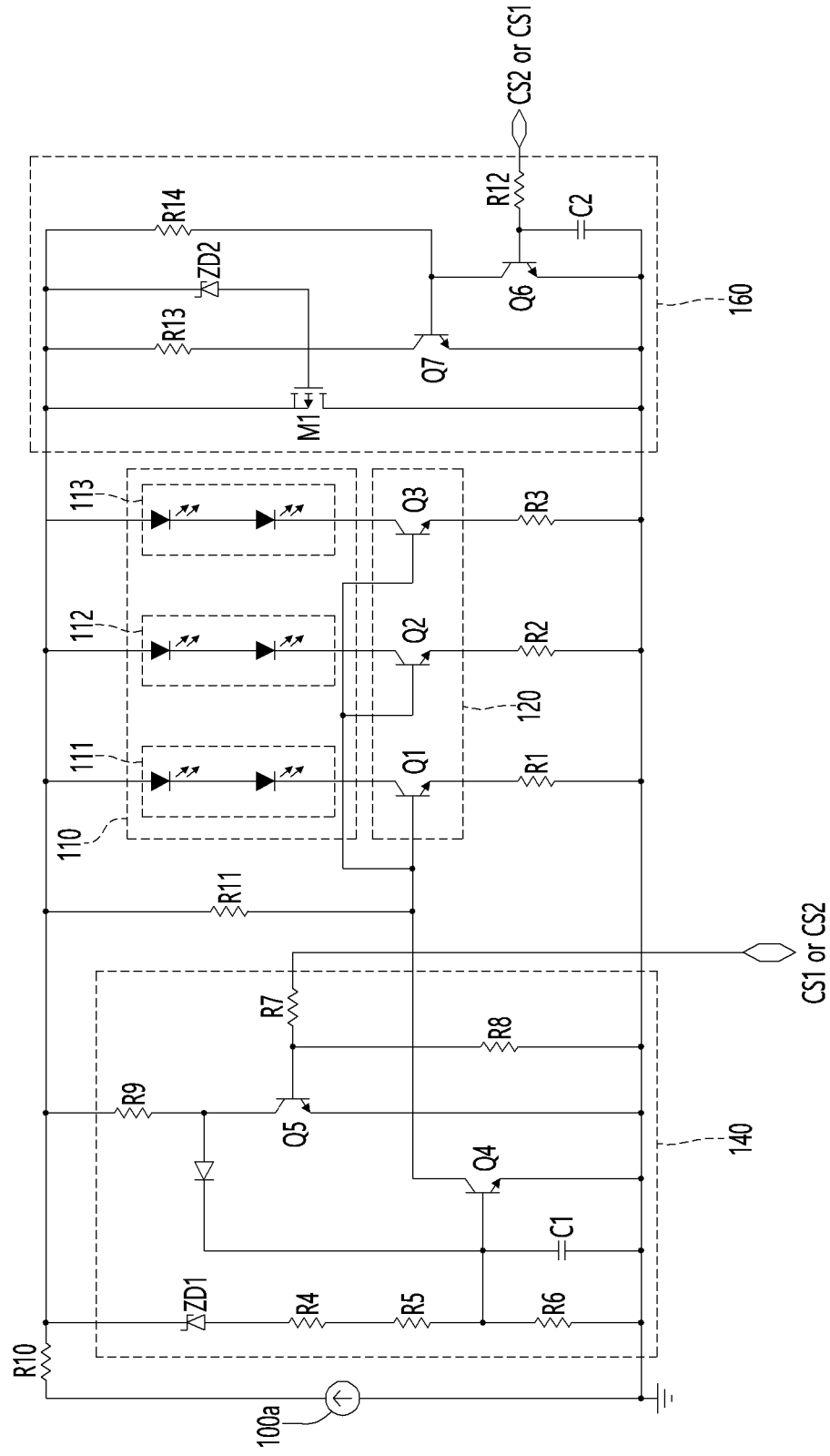
[FIG. 9]

【FIG. 10】
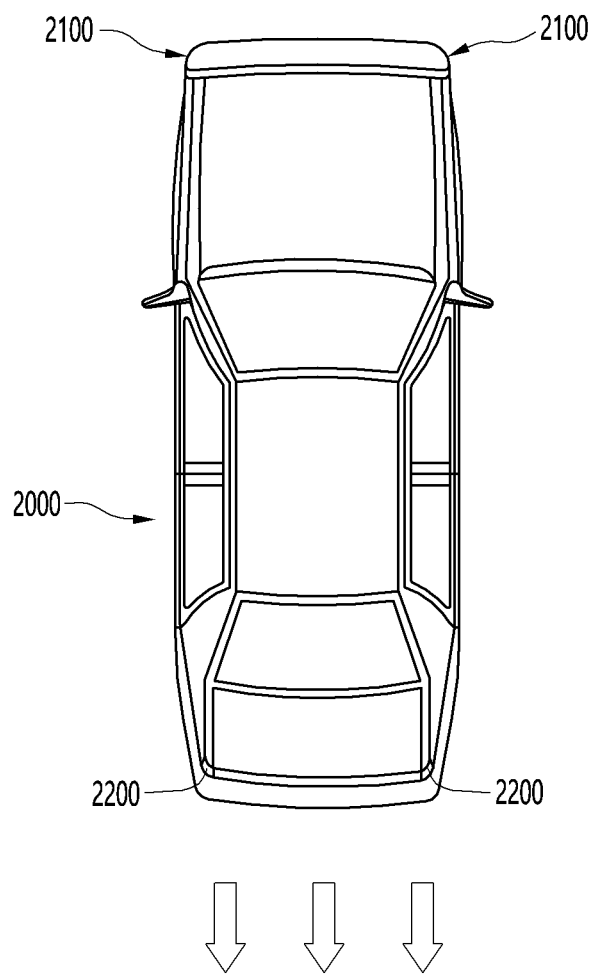

【FIG. 11】
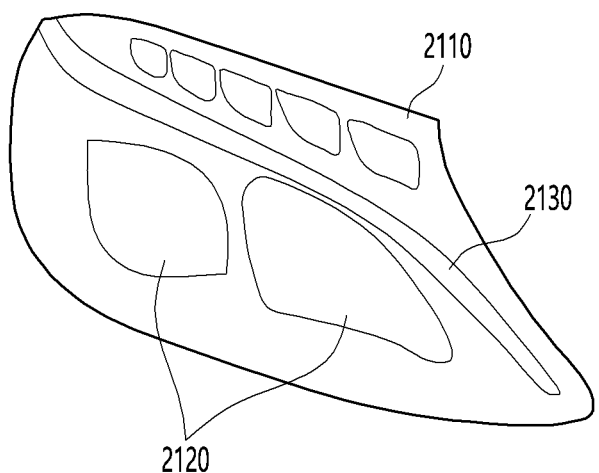
【FIG. 12】
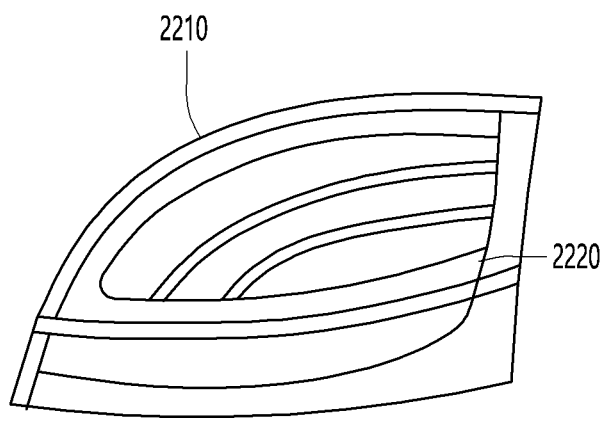

LIGHT SOURCE DRIVING APPARATUS

CROSS-REFERENCE TO RELATED PATENT APPLICATIONS

This application is a U.S. National Stage Application under 35 U.S.C. § 371 of PCT Application No. PCT/KR2021/017984, filed Dec. 1, 2021, which claims priority to Korean Patent Application No. 10-2020-0165785, filed Dec. 1, 2020, whose entire disclosures are hereby incorporated by reference.

TECHNICAL FIELD

An embodiment relates to a light source driving apparatus, and in particular, to a light source driving apparatus capable of sensing various abnormal states of a light source part and stopping driving of the light source part as the abnormal state is sensed.

BACKGROUND ART

A light device is a device capable of supplying light or adjusting the amount of light and is used in various fields. For example, the light device may be applied to various fields such as a vehicle and a building to illuminate an interior or exterior.

In particular, recently, a light emitting device has been used as a light source for lighting. Such a light emitting device, for example, a light emitting diode (LED), has advantages such as low power consumption, semi-permanent lifespan, fast response speed, safety, and environmental friendliness compared to conventional light sources such as fluorescent lamps and incandescent lamps. Such the light emitting diode is applied to various optical assemblies such as various display devices and indoor or outdoor lights.

In general, a lamp of various colors and shapes is applied to a vehicle, and recently, lamps employing light emitting diodes have been proposed as light sources for vehicles. For example, light emitting diodes are applied to a head lamp, a tail lamp, a turn signal lamp, a daytime running lamp, and a side lamp of the vehicles.

In this case, a driving apparatus for controlling the driving of the lamp as described above controls the light emitting diode by receiving PWM (Pulse Width Modulation) type current from a power supply unit (not shown) and supplying the current to the light emitting diode. In this case, a brightness of the light emitting diode may be controlled by adjusting a strength of the applied current.

On the other hand, a symmetrical control method using a transistor is adopted for the configuration of a recent low-cost light source driving apparatus, when a plurality of light emitting diodes are configured in series or/and parallel, a linear circuit is adopted to control each light emitting diode. However, the linear circuit as described above has limitations in controlling the light emitting diode with a high current, and accordingly, it mainly uses a constant current circuit using a transistor.

However, the constant current circuit using the transistor as described above does not have a sensing circuit capable of sensing various abnormal state events occurring in a driving environment of the light emitting diode, and accordingly, even when the above-described abnormal state event is sensed, a reliability problem arises due to the continuous driving of the light emitting diode.

DISCLOSURE

Technical Problem

The embodiment provides a light source driving apparatus capable of sensing various abnormal states that may occur in a driving environment of a light emitting diode and protecting the light emitting diode from them.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A light source driving apparatus according to an embodiment comprises a light source part; a constant current driving part connected to the light source part, including a first switching device, and supplying a constant current to the light source part according to a switching operation of the first switching device; a driving control part outputting a switching signal for controlling the first switching device consisting the constant current driving part; an abnormal state sensing part sensing an abnormal state of the light source part and an abnormal state of the driving control part, and outputting a control signal according to a result of the sensing; and a protective circuit part selectively operating based on the control signal output from the abnormal state sensing part to stop an operation of the constant current driving part and an operation of the light source part.

In addition, the first protective circuit part includes at least one of a first protective circuit part connected to an input terminal of the light source part and a second protective circuit part connected to an output terminal of the light source part.

In addition, the first protective circuit part includes: a second switching device connected to the abnormal state sensing part and performing a switching operation according to the control signal output from the abnormal state sensing part; and a third switching device connected to the second switching device and performing a switching operation according to a switching operation of the second switching device.

In addition, the second switching device includes: a first base terminal connected to the abnormal state sensing part; a first collector terminal connected to the input terminal of the light source part; and a first emitter terminal connected to a ground; wherein the third switching device includes: a second base terminal connected to the first collector terminal of the second switching device; a second collector terminal connected to the base terminal of the first switching device; and a second emitter terminal connected to a ground.

In addition, the second switching device is turned on when the control signal is at a first level and turned off when the control signal is at a second level, wherein the third switching device is turned off when the control signal is at the first level and turned on when the control signal is at the second level, and wherein the first switching device maintains a turn-off state when the third switching device is in a turn-on state.

In addition, the first protective circuit part includes a first Zener diode having a first cathode terminal connected to the input terminal of the light source part and an anode terminal connected to the second base terminal of the third switching device.

In addition, the first Zener diode is turned on when a second voltage higher than a first voltage is applied to the input terminal of the light source part, wherein the third switching device is changed to a turn-on state in response to the turn-on of the first Zener diode, and wherein the first switching device maintains a turn-off state when the third switching device is in a turn-on state.

In addition, the second protective circuit part includes: a fourth switching device connected to the abnormal state sensing part and performing a switching operation according to the control signal output from the abnormal state sensing part; a fifth switching device connected to the fourth switching device and performing a switching operation according to a switching operation of the fourth switching device; and a sixth switching device connected to the fifth switching device and performing a switching operation according to a switching operation of the fifth switching device.

In addition, the fourth switching device includes: a third base terminal connected to the abnormal state sensing part; a third collector terminal connected to the fifth switching device; and a third emitter terminal connected to a ground, wherein the fifth switching device includes: a fourth base terminal connected to the third collector terminal of the fourth switching device; a fourth collector terminal connected to the output terminal of the light source part and the sixth switching device; and a fourth emitter terminal connected to a ground, wherein the sixth switching device includes: a source terminal connected to the output terminal of the light source part; a gate terminal connected to the fourth collector terminal of the fifth switching device; and a drain terminal connected to a ground.

In addition, the fourth switching device is turned on when the control signal is at a first level and turned off when the control signal is at a second level, wherein the fifth switching device is turned off when the control signal is at the first level and turned on when the control signal is at the second level, wherein the sixth switching device is turned off when the control signal is at the first level and turned on when the control signal is at the second level, wherein when the sixth switching device is in a turn-on state, a current applied to the light source part flows through a path passing through the sixth switching device.

In addition, the abnormal state sensing part includes a first AND gate for receiving a first state signal and a second state signal and outputting a first control signal according to the first and second state signals; and a second AND gate for receiving the first state signal and a third state signal and outputting a second control signal according to the first and third state signals.

In addition, the first state signal is a state signal of power supplied to the driving control part, the second state signal is a state signal of a clock signal output from the driving control part, and the third state signal includes a state signal corresponding to an open state or a short state of the light source part.

In addition, the protective circuit part includes the first protective circuit part and the second protective circuit part, the first AND gate outputs the first control signal to one of the first protective circuit part and the second protective circuit part, and the second AND gate outputs the second control signal to the other protective circuit part of the first protective circuit part and the second protective circuit part.

Advantageous Effects

The embodiment can improve an operational reliability of the light source part. For example, an embodiment may include a first protective circuit part disposed on an input terminal of a light source part. The first protective circuit part operates when an abnormal state of the light source part, an abnormal state of power supplied to the driving control part, and an abnormal state of a clock signal provided from the driving control part are sensed to stop a light emitting operation of the light source part. Accordingly, the embodiment can solve the reliability problem that may occur as the light source part continues to operate in various abnormal states as described above, and can protect each component circuit consisting the light source driving apparatus.

DESCRIPTION OF DRAWINGS

FIG. 1 is a block diagram showing a configuration of a light source driving apparatus according to an embodiment.

FIG. 2 is a block diagram showing a light source part of FIG. 1 in detail according to another embodiment.

FIG. 3 is a circuit diagram showing the light source driving apparatus shown in FIG. 1 in detail.

FIG. 4 is a diagram showing an operation example of a light source part shown in FIG. 3.

FIG. 5 is a circuit diagram showing an abnormal state sensing part shown in FIG. 1 in detail.

FIG. 6 is a diagram showing operating waveforms of a light source driving apparatus according to an embodiment.

FIG. 7 is a block diagram showing a configuration of a light source driving apparatus according to another embodiment.

FIG. 8 is a circuit diagram showing a light source driving apparatus shown in FIG. 7 in detail.

FIG. 9 is a circuit diagram showing a light source driving apparatus according to another embodiment in detail.

FIG. 10 is a top view of a vehicle to which a lamp having a light source driving apparatus according to an embodiment is applied.

FIG. 11 is an example in which a light source driving apparatus according to an embodiment is disposed at a front of a vehicle.

FIG. 12 is an example in which a light source driving apparatus according to an embodiment is disposed at a rear of a vehicle.

MODE FOR INVENTION

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and substituted for use.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art.

Further, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements. In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

FIG. 1 is a block diagram showing a configuration of a light source driving apparatus according to an embodiment, and FIG. 2 is a block diagram showing a light source part of FIG. 1 in detail according to another embodiment.

Referring to FIG. 1, the light source driving apparatus includes a light source part 110, a constant current driving part 120, a driving control part 130, a first protective circuit part 140, and an abnormal state sensing part 150.

The light source part 110 may include at least one light emitting diode.

When the light source part 110 includes a plurality of light emitting diodes, the plurality of light emitting diodes may be connected in series or in parallel.

The light source part 110 may include a light emitting package in which a light emitting diode chip is packaged. The light emitting diode chip may emit at least one of blue, green, red, ultraviolet (UV) and infrared light.

The light source part 110 may be mounted at a vehicle to configure a lamp. For example, one or more of the light source part 110 may be disposed at least one of the front, rear, and side of the vehicle. For example, the light source part 110 may be applied to a front lamp of a vehicle. For example, the light source part 110 may perform at least one function of a head lamp, a turn signal lamp, a daytime running lamp, a high lamp, a low lamp, and a fog lamp by emitting light. For example, the light source part 110 may provide additional functions such as a welcome lamp or a celebration effect by emitting light in conjunction with the opening of a vehicle door. For example, the light source part 110 may be applied to a rear lamp that performs at least one function of a side lamp, a brake lamp, and a turn signal lamp by emitting light.

The light source part 110 may be driven by an applied current. For example, a pulse-type current may be applied to the driving apparatus of the embodiment from a main control module (not shown). For example, the current may be a constant current. To this end, an input terminal of the light source part 110 may include a constant current input part 100a into which constant current is input from the main control module.

A pulse width modulation (PWM) type current may be applied to the constant current input part 100a. The main control module may be a module that controls a specific main lamp among a plurality of lamps provided in the vehicle. For example, the main control module may be a Headlamp Control Module (HCM) that controls headlamps, but is not limited thereto. In addition, it has been described above that the current output from a separate module is applied to the light source part 110 of the light source driving apparatus, but is not limited thereto. In addition, it has been described above that the current supplied from a separate module is applied to the light source part 110 of the light source driving apparatus, but is not limited thereto. For example, the light source driving apparatus may additionally include a converter (not shown) connected to a vehicle battery (not shown) and driving the light source part 110 based on power supplied by discharging the battery.

The light source part 110 is driven by the current applied from a constant current input part 100a to output light of a specific color and specific brightness.

The light source part 110 may include one light emitting diode, or may include a plurality of light emitting diodes. For example, when the light source part 110 includes a plurality of light emitting diodes, the plurality of light emitting diodes may be simultaneously turned on or simultaneously turned off.

For example, the light source part 110 may be divided into a plurality of channels. For example, the light source part 110 includes a first light source part 111 of a first channel including a plurality of light emitting diodes, a second light source part 112 of a second channel including a plurality of light emitting diodes, and a third light source part 113 of a third channel including a plurality of light emitting diodes. In this case, the light emitting diode consisting each of the first to third light source parts 111, 112, and 113 may be consist of one, and alternatively, may have a structure in which two or more light emitting diodes are connected in series to each other.

In addition, the plurality of light emitting diodes consisting the first light source part 111 may be simultaneously turned on and simultaneously turned off. In addition, the plurality of light emitting diodes consisting the second light source part 112 may be simultaneously turned on and simultaneously turned off. In addition, the plurality of light emitting diodes consisting the third light source part 113 may be simultaneously turned on and simultaneously turned off. For example, the plurality of light emitting diodes of the first light source part 111, the second light source part 112, and the third light source part 113 consisting the respective channels may be driven by an applied current to simultaneously perform a light emitting operation, and may be simultaneously turned off as the applied current is blocked.

In addition, the first light source part 111, the second light source part 112, and the third light source part 113 including a plurality of light emitting diodes may be simultaneously turned on and simultaneously turned off.

Alternatively, the first light source part 111, the second light source part 112, and the third light source part 113 may be turned on at different time points and turned off at different time points. For example, the plurality of light emitting diodes consisting the first light source part 111 are turned on at a first time point, and the plurality of light emitting diodes consisting the second light source part 112 are turned on at a second time point different from the first time point and the plurality of light emitting diodes consisting the third light source part 113 can be turned on at a third time point different from the first time point and the second time point.

Meanwhile, the plurality of light emitting diodes consisting each of the first light source part 111, the second light source part 112, and the third light source part 113 may be turned on sequentially or step by step. For example, the first light source part 111 may include first to third light emitting diodes. In addition, the first to third light emitting diodes may emit light at different time points. For example, at least one of the first to third light emitting diodes may emit light at a first time point, and at least the other one may emit light at a second time point slower than the first time point. For example, the first to third light emitting diodes may emit light at a predetermined time interval. Accordingly, the light source part 110 in the embodiment may provide an animation effect by sequentially turning on a plurality of light emitting diodes. Meanwhile, the first to third light emitting diodes as described above may emit light at different time points and turn off at the same time. For the step-by-step light emission operation as described above, each of the first light source part 111, the second light source part 112, and the third light source part 113 may have the following circuit configuration.

FIG. 2 is a detailed configuration diagram of any one light source part among the first light source part 111, the second light source part 112, and the third light source part 113.

Referring to FIG. 2, at least one of the first light source part 111, the second light source part 112, and the third light source part 113 includes a first light emitting diode 210 and a second light emitting diode 220. The first light emitting diode 210 and the second light emitting diode 220 may be connected in series. In this case, although at least one of the first light source part 111, the second light source part 112, and the third light source part 113 is illustrated as including two light emitting diodes, it is not limited thereto. For example, at least one of the first light source part 111, the second light source part 112, and the third light source part 113 includes three or more light emitting diodes, and may realize an animation effect by sequentially or stepwise lighting the light emitting diodes.

In addition, the light source part may include a sensing part connected to both ends of each light emitting diode and sensing an abnormal state of each light emitting diode. For example, the light source part may operate in an abnormal state. For example, an abnormal state such as open or short may occur during operation of the first light emitting diode 210 and the second light emitting diode 220. Also, the first sensing part 230 may sense an abnormal state that may occur in the first light emitting diode 210. Also, the second sensing part 240 may sense an abnormal state that may occur in the second light emitting diode 210. The abnormal state may include an open state and a short state of the light emitting diode. The first sensing part 230 may sense a first voltage of both ends of the first light emitting diode 210. Also, the second sensing part 240 may sense a second voltage of both ends of the second light emitting diode 220.

In addition, the light source part may include an individual switch. The individual switch may be individually connected to each light emitting diode. The individual switch may control the current flowing through each light emitting diode. For example, each individual switch may include a first individual switch 250. The first individual switch 250 is connected to both ends of the first light emitting diode 210 to control current flowing through the first light emitting diode 210. Also, the individual switch may include a second individual switch 260. The second individual switch 260 is connected to both ends of the second light emitting diode 220 to control the current flowing through the second light emitting diode 220. The first individual switch 250 may allow current to be supplied to the first light emitting diode 210 in a turn-on state, and block the current flowing through the first light emitting diode 210 in a turn-off state. Similarly, the second individual switch 260 may allow current to be supplied to the second light emitting diode 220 in a turn-on state and block the current flowing in the second light emitting diode 220 in a turn-off state.

In addition, the light source part may include an individual control part 270. The individual control part 270 may control the light emitting operation of the first light emitting diode 210 by controlling a switching state of the first individual switch 250. In addition, the individual control part 270 may control the light emitting operation of the second light emitting diode 220 by controlling the switching state of the second individual switch 260. In addition, the individual control part 270 may be connected to the abnormal state sensing part 150 of the light source driving apparatus to transmit abnormal state information of the first light emitting diode 210 and the second light emitting diode 220 to the abnormal state sensing part 150. For example, when both of the first voltage sensed through the first sensing part 230 and the second voltage sensed through the second sensing part 240 are within a normal range, the individual control part 270 may output a high signal to the abnormal state sensing part 150. In addition, when at least one of the first voltage sensed through the first sensing part 230 and the second voltage sensed through the second sensing part 240 is out of the normal range, the individual control part 270 may output a low signal to the abnormal state sensing part 150.

As described above, a sensing part, an individual switch, and an individual control part are included in a high-spec light source part capable of implementing animation effects, and accordingly, it is possible to individually control each light emitting diode.

Meanwhile, the constant current driving part 120 may control the constant current of the light source part 110. For example, the constant current driving part 120 may include a switching device connected to an output terminal of the light source part 110.

A switching device consisting the constant current driving part 120 may control a strength of current flowing through the light source part 110. For example, the constant current driving part 120 may perform a switching operation so that a constant current is supplied to the light source part 110. To this end, the constant current driving part 120 may feedback the current flowing through the light source part 110 and itself. And, the constant current driving part 120 can maintain the constant current by varying an output amplitude according to a result of the feedback. For example, the constant current driving part 120 may generate a pulse width modulation (PWM) control signal for linearly controlling luminance dimming of the light source part 110. For example, the constant current driving part 120 may control a duty ratio of the PWM control signal for dimming the luminance of the light source part 110. In addition, the constant current driving part 120 may perform a switching operation according to the PWM control signal and serve as a load absorbing a voltage difference according to an increase or decrease in voltage applied to the light source part 110.

A driving control part 130 may generate the PWM control signal and control the constant current driving part 120 based on the PWM control signal. The driving control part 130 may include a microcomputer, but is not limited thereto. The driving control part 130 may provide a clock signal and allow overall operations of the light source driving apparatus according to the clock signal. For example, the driving control part 130 may control the constant current driving part 120 based on the clock signal.

The embodiment includes a first protective circuit part 140. The first protective circuit part 140 may be disposed between the constant current input part 100a and the light source part 110. When an abnormal state occurs during the operation of the light source part 110, the first protective circuit part 140 may stop the operation of the light source part 110, for example, blocking the current flowing through the light source part 110. To this end, the first protective circuit part 140 can be disposed between the input terminal of the light source part 110 and the constant current driving part 120. In addition, the first protective circuit part 140 transmits a corresponding signal to the constant current driving part 120 when the abnormal state is sensed. In addition, the constant current driving part 120 may block the current flowing through the light source part 110 by performing a switching operation by a signal provided from the first protective circuit part 140. For example, the constant current driving part 120 may operate in a turn-off state by a signal provided from the first protective circuit part 140 to block the current applied to the light source part 110.

The abnormal state sensing part 150 may sense various abnormal states that may occur during the operation of the light source part 110 and output a control signal corresponding to whether or not the abnormal state is sensed.

For example, when an abnormal state is sensed during the operation of the light source part 110, the abnormal state sensing part 150 may output a low-level control signal. The low-level control signal output from the abnormal state sensing part 150 may be a signal for operating the first protective circuit part 140. For example, the first protective circuit part 140 may include at least one switching device. In addition, the switching device of the first protective circuit part 140 may operate in a turn-on state by the low-level control signal output from the abnormal state sensing part 150. And, the switching device consisting the constant current driving part 120 may operate in a turn-off state as the switching device of the first protective circuit part 140 operates in a turn-on state. In addition, the operation of the light source part 110 may be stopped as the switching device consisting the constant current driving part 120 operates in a turned-off state.

Hereinafter, a detailed circuit configuration of the light source driving apparatus and their connection relationship will be described.

FIG. 3 is a circuit diagram showing the light source driving apparatus shown in FIG. 1 in detail, FIG. 4 is a diagram showing an operation example of a light source part shown in FIG. 3, FIG. 5 is a circuit diagram showing an abnormal state sensing part shown in FIG. 1 in detail, and FIG. 6 is a diagram showing operating waveforms of a light source driving apparatus according to an embodiment.

Referring to FIG. 3, the light source part 110 may be divided into a plurality of channels. For example, the light source part 110 may include a first light source part 111, a second light source part 112, and a third light source part 113 divided into different channels. In addition, each light source part divided into the different channels may include at least one light emitting diode. In this case, in the embodiment, the first light source part 111, the second light source part 112, and the third light source part 113 are illustrated as including two light emitting diodes, but are not limited thereto. For example, at least one of the first light source part 111, the second light source part 112, and the third light source part 113 may contain only one light emitting diode, and at least one other light source part may include three or more light emitting diodes.

The constant current driving part 120 includes a switching device. The constant current driving part 120 may include a switching device connected to an output terminal of a light source part of each channel. For example, the constant current driving part 120 may include a first switching device Q1 connected to an output terminal of the first light source part 111. In addition, the constant current driving part 120 may include a second switching device Q2 connected to an output terminal of the second light source part 112. In addition, the constant current driving part 130 may include a third switching device Q3 connected to an output terminal of the third light source part 113.

The first switching device Q1 may selectively perform a switching operation so that a constant current is supplied to the first light source part 111. The first switching device may include an NPN type transistor, but is not limited thereto. A collector terminal of the first switching device Q1 may be connected to an output terminal of the first light source part 111. Also, an emitter terminal of the first switching device Q1 may be connected to a ground. In addition, a base terminal of the first switching device Q1 may be connected to an output terminal of the first protective circuit part 140. In addition, the base terminal of the first switching device Q1 may be connected to the driving control part 130. Accordingly, the first switching device Q1 may perform a turn-on operation or a turn-off operation by a switching signal applied from the driving control part 130 under a normal operating condition. In addition, the first switching device Q1 may perform a turn-off operation by a signal output from the first protective circuit part 140 in an abnormal operating condition in which an abnormal state occurs.

The second switching device Q2 may selectively perform a switching operation so that a constant current is supplied to the second light source part 112. A collector terminal of the second switching device Q2 may be connected to an output terminal of the second light source part 112. Also, an emitter terminal of the second switching device Q2 may be connected to a ground. In addition, a base terminal of the second switching device Q2 may be connected to an output terminal of the first protective circuit part 140. In addition, the base terminal of the second switching device Q2 may be connected to the driving control part 130. Accordingly, the second switching device Q2 may perform a turn-on operation or a turn-off operation by the switching signal applied from the driving control part 130 under a normal operating condition. In addition, the second switching device Q2 may perform a turn-off operation by a signal output from the first protective circuit part 140 in an abnormal operating condition in which an abnormal state occurs.

The third switching device Q3 may selectively perform a switching operation so that a constant current is supplied to the third light source part 113. A collector terminal of the third switching device Q3 may be connected to an output terminal of the third light source part 113. Also, an emitter terminal of the third switching device Q3 may be connected to a ground. In addition, the base terminal of the third switching device Q3 may be connected to an output terminal of the first protective circuit part 140. Also, a base terminal of the third switching device Q3 may be connected to the driving control part 130. Accordingly, the third switching device Q3 may perform a turn-on operation or a turn-off operation by the switching signal applied from the driving control part 130 under a normal operating condition. In addition, the third switching device Q3 may perform a turn-off operation by a signal output from the first protective circuit part 140 in an abnormal operating condition in which an abnormal state occurs.

Meanwhile, the driving control part 130 may include a first resistor R1, a second resistor R2, and a third resistor R3. The first resistor R1 may be disposed between an emitter terminal of the first switching device Q1 and the ground. The second resistor R2 may be disposed between an emitter terminal of the second switching device Q2 and the ground. The third resistor R3 may be disposed between an emitter terminal of the third switching device Q3 and the ground.

Meanwhile, the first protective circuit part 140 may include a plurality of resistors, capacitors, Zener diodes, diodes, and switching devices. For example, the first protective circuit part 140 may include a third switching device Q4, a fifth switching device Q5, a first Zener diode ZD1, a diode, a first capacitor C1, a fourth resistor R4, a fifth resistor R5, a sixth resistor R6, a seventh resistor R7, an eighth resistor R8, and a ninth resistor R10.

A cathode terminal of the first Zener diode ZD1 may be connected between the output terminal of the constant current input part 100*a* and the input terminal of the light source part 110. An anode terminal of the first Zener diode ZD1 may be connected to one end of the fourth resistor R4.

The fourth resistor R4 may have one end connected to the anode terminal of the first Zener diode ZD1 and the other end connected to one end of the fifth resistor R5.

One end of the fifth resistor R5 may be connected to the other end of the fourth resistor R4, and the other end of the fifth resistor R5 may be connected to the base terminal of the fourth switching device Q4 and one end of the sixth resistor R6.

The sixth resistor R6 has one end connected to the base terminal of the fourth switching device Q4 and the other end of the fifth resistor R5, and the other end connected to the ground.

The seventh resistor R7 may have one end connected to the output terminal of the abnormal state sensing part 150 and the other end connected to one end of the eighth resistor R8 and the base of the fifth switching device Q5.

The eighth resistor R8 has one end connected to the other end of the seventh resistor R7 and the base terminal of the fifth switching device Q5, and the other end connected to the ground.

One end of the ninth resistor R9 may be connected to the input terminal of the light source part 110 and the other end of the ninth resistor R9 may be connected to the anode terminal of the diode.

The fourth resistor R4, the fifth resistor R5, the sixth resistor R6, the seventh resistor R7, the eighth resistor R8, and the ninth resistor R9 may be provided for operation reliability of each element consisting the first protective circuit part 140. For example, the fourth resistor R4, the fifth resistor R5, the sixth resistor R6, the seventh resistor R7, the eighth resistor R8, and the ninth resistor R9 may reduce the current or voltage applied to an arranged position.

Meanwhile, a base terminal of the fourth switching device Q4 of the first protective circuit part 140 may be connected between the other end of the fifth resistor R5 and one end of the sixth resistor R6. For example, the base terminal of the fourth switching device Q4 may be connected to the anode terminal of the first Zener diode ZD1 through the fourth resistor R4 and the fifth resistor R5. A collector terminal of the fourth switching device Q4 may be connected to the constant current driving part 120. Specifically, the collector terminal of the fourth switching device Q4 may be connected to the base terminal of the switching device consisting the constant current driving part 120. For example, the collector terminal of the fourth switching device Q4 may be connected to the base terminal of the first switching device Q1, the base terminal of the second switching device Q2, and the base terminal of the third switching device Q3, respectively.

A base terminal of the fifth switching device Q5 may be connected to the one end of the eighth resistor R8 and the other end of the seventh resistor R7. Specifically, the base terminal of the fifth switching device Q5 may be connected to the output terminal of the abnormal state sensing part 150 through the seventh resistor R7. And, the fifth switching device Q5 may be turned on or turned off based on a first control signal CS1 and/or a second control signal CS2 output through the output terminal of the abnormal state sensing part 150.

A collector terminal of the fifth switching device Q5 may be connected to the other end of the ninth resistor and the anode terminal of the diode. In addition, the emitter terminal of the fifth switching device Q5 may be connected to the ground.

In addition, the diode may have an anode connected to the other end of the ninth resistor R9 and a collector terminal of the fifth switching device Q5, and a cathode connected to the base terminal of the fourth switching device Q4.

The first capacitor C1 may have one end connected to the base terminal of the fourth switching device Q4, the other end of the fifth resistor R5, the one end of the sixth resistor R6 and the cathode terminal of the diode, and the other end connected to the ground.

Meanwhile, the light source driving apparatus as described above may include a tenth resistor R10 and an eleventh resistor R11. The tenth resistor R10 may be disposed between the constant current input part 100*a* and the light source part 110. Also, the eleventh resistor R11 may be disposed between the input terminal of the light source part 110 and the constant current driving part 120.

In the light source driving apparatus as described above, when a constant current is applied from the constant current input part 100*a* under a normal operating condition, the applied constant current may be applied to the light source part 110. For example, when the light source part 110 is composed of three channels, the applied constant current may be equally distributed and applied to each of the three channels. For example, when the applied constant current is 1 A, a constant current of ⅓ A may be applied to each of the light source parts of the three channels. And, the constant current driving part 120 may perform a switching operation for regulating the constant current applied to the light source part of each channel. Accordingly, a constant current is applied to the light source part 110 under the normal operating conditions as described above, and a light emitting operation can be performed by the applied constant current.

Meanwhile, the first protective circuit part 140 may be activated when an abnormal state is sensed during the operation of the light source part 110 to turn off the switching device consisting the constant current driving part 120.

For example, the first protective circuit part 140 may operate when the light source part 110 is open. That is, the light source part 110 is composed of a plurality of channels, and when a light source part corresponding to any one of the plurality of channels is opened, an operation of the first protective circuit part 140 may be started.

To this end, the cathode end of the first Zener diode ZD1 of the first protective circuit part 140 is connected to the input terminal of the light source part 110. In this case, when the light source part 110 is in a normal state, a first voltage may be applied to an input terminal of the light source part 110, for example, a cathode terminal of the first Zener diode ZD1. Further, when an open of the light emitting diode of the light source part of at least one of the plurality of channels consisting the light source part 110 occurs, a second voltage greater than the first voltage is applied to the cathode terminal of the first Zener diode ZD1.

The first Zener diode ZD1 may maintain a turned-off state when the first voltage is applied to the cathode terminal. Also, the first Zener diode ZD1 may be selectively turned on when a voltage applied to the cathode terminal increases. For example, the first Zener diode ZD1 may be selectively turned on when a voltage higher than a predetermined threshold voltage is applied to the cathode terminal. For example, the first Zener diode ZD1 may be turned on when a second voltage higher than the first voltage is applied to the cathode terminal.

On the other hand, the fourth switching device Q4 can be turned off under the condition of operating in the normal state of the light source part 110. Also, the fourth switching device Q4 may be selectively turned on under the condition that the light source part 110 operates in an abnormal state. For example, the fourth switching device Q4 may maintain a turned-off state in a state in which the first Zener diode (ZD1) is turned off. In addition, when the first Zener diode ZD1 is turned on as the voltage of the input terminal of the light source part 110 increases, the fourth switching device Q4 may be turned on in conjunction with the switching operation of the first Zener diode ZD1. In this case, the collector terminal of the fourth switching device Q4 is connected to the constant current driving part 120. In other words, the collector terminal of the fourth switching device Q4 is connected to each base terminal of the first switching device Q1, second switching device Q2 and third switching device Q3 constituting the constant current driving part 120. Therefore, when the fourth switching device Q4 is turned on, each of the first switching device Q1, the second switching device Q2, and the third switching device Q3 may be turned off. In addition, when the first switching device Q1, the second switching device Q2, and the third switching device Q3 are turned off, the current applied to the light source part 110 may be blocked.

As described above, the first protective circuit part 140 in the embodiment includes the first Zener diode ZD1 connected to the input terminal of the light source part 110. In addition, the first Zener diode ZD1 is turned on in conjunction with the opening of a specific channel of the light source part 110 to sense an abnormal state of the light source part 110. In addition, the fourth switching device Q4 may be turned on and turn off the constant current driving part 120 when an abnormal state according to the turn-on of the first Zener diode ZD1 is sensed.

Meanwhile, as described above, the first protective circuit part 140 includes a connection end connected to the abnormal state sensing part 150. And, the base terminal of the fifth switching device Q5 is connected to the connection end through the seventh resistor R7.

In this case, the fifth switching device Q5 maintains a turn-on state under a normal operating condition. And, the fifth switching device Q5 may perform a turn-off operation when a control signal corresponding to a specific abnormal state sensing is transmitted through the abnormal state sensing part 150. For example, the abnormal state sensing part 150 may output a control signal of a first level when the light source driving apparatus operates normally, and output a control signal of a second level when the light source driving apparatus operates abnormally. The fifth switching device Q5 may maintain a turn-on state when a control signal of a first level is input from the abnormal state sensing part 150 through the input terminal. Alternatively, the fifth switching device Q5 may change to a turn-off state when a control signal of a second level is input from the abnormal state sensing part 150 through the input terminal.

In this case, when the fifth switching device Q5 is changed to a turn-off state, the current applied from the constant current driving part 120 may be applied to the fourth switching device Q4 through a ninth resistor R9 and a diode. In addition, the fourth switching device Q4 can be turned on by a current applied through the ninth resistor R9 and a diode. For example, the fourth switching device Q4 may operate in a turn-off state before the current is applied, and operate in a turn-on state at the time when the current is applied. In addition, when the fourth switching device Q4 operates in a turn-on state, the first switching device Q1, each of the second switching device Q2, and the third switching device Q3 of the constant current driving part 120 connected to the fourth switching device Q4 may be turned off. Accordingly, when a control signal of a second level notifying the abnormal state is applied to the first protective circuit part 140, each of the switching devices of the constant current driving part 120 may be turned off by the fifth switching device Q5 and the fourth switching device Q4. In addition, the embodiment allows the constant current driving part 120 to operate in a turn-off state when the light source driving apparatus operates in an abnormal state, so that the operation of the light source part 110 may be stopped.

Meanwhile, control signals corresponding to sensing results of various abnormal states may be input to the input terminal of the first protective circuit part 140.

For example, the various abnormal states includes a first abnormal state corresponding to the open state or short state of the light source part 110, a second abnormal state corresponding to the interruption of power supplied to the driving control part 130, and a third abnormal state corresponding to a case in which a clock signal is not generated in the driving control part 130, and control signals corresponding to the abnormal states may be input to an input terminal of the first protective circuit part 140.

That is, the abnormal state sensing part 150 may output the control signal of the second level when any one of the abnormal states defined above occurs. And, when the control signal of the second level is output, the fifth switching device Q5 of the first protective circuit part 140 is turned off, and thus the fourth switching device Q4 is turned on, and accordingly, operations of the constant current driving part 120 and the light source part 110 may be stopped.

The detailed configuration of the abnormal state sensing part 150 and characteristics of the output of the control signal of the second level will be described in more detail.

The abnormal state sensing part 150 may include a plurality of AND gates. For example, the abnormal state sensing part 150 may include a first AND gate 154 and a second AND gate 155. An output terminal OP1 of the first AND gate 154 and an output terminal OP2 of the second AND gate 155 may be respectively connected to an input terminal of the first protective circuit part 140. For example, the first AND gate 154 performs a logical multiplication operation on signals input through the input terminals IP1 and IP2 and outputs a first control signal corresponding to a result of the logical multiplication operation. For example, the second AND gate 155 performs a logical multiplication operation on signals input through the input terminals IP3 and IP4 and outputs a second control signal corresponding to a result of the logical multiplication operation. To this end, specific signals may be respectively input to input terminals of the first AND gate 154 and the second AND gate 154.

A power signal PSS of the driving control part 130 may be input to a first input terminal IP1 of the first AND gate 154. For example, the first input terminal IP1 of the first AND gate 154 may be connected to a power signal (PSS) terminal 151 of the driving control part 130.

A clock signal (CLKS) of the driving control part 130 may be input to a second input terminal IP2 of the first AND gate 154. For example, the clock signal (CLKS) terminal 152 of the driving control part 130 may be connected to the second input terminal IP2 of the first AND gate 154.

Accordingly, the first AND gate 154 may output a first control signal based on the power signal of the driving control part 130 input through the first input terminal IP1 and the clock signal of the driving control part 130 input through the second input terminal IP2. For example, the first AND gate 154 may output a first control signal of a first level in a condition in which the power signal of the driving control part 130 and the clock signal of the driving control part 130 are normally input. In addition, the first AND gate 154 may output a first control signal of a second level in an abnormal state condition in which at least one of the power signal of the driving control part 130 and the clock signal of the driving control part 130 is not input. In addition, the first control signal may be provided to an input terminal of the first protective circuit part 140. For example, when the first control signal of the first level is output through the first AND gate 154, the fifth switching device Q5 of the first protective circuit part 140 may maintain a turn-on state. For example, when the first control signal of the second level is output through the first AND gate 154, the fifth switching device Q5 of the first protective circuit part 140 may be changed to a turn-off state.

The power signal PSS of the driving control part 130 may be input to the third input terminal IP3 of the second AND gate 155. For example, the third input terminal IP3 of the second AND gate 155 may be connected to the power signal (PSS) terminal 151 of the driving control part 130.

A state sensing signal of the light source part 110 may be input to the fourth input terminal IP4 of the second AND gate 155. For example, the fourth input terminal IP4 of the second AND gate 155 may be connected to a feedback signal (FS) output terminal 153 of a sensing block that senses a state of the light source part 110. For example, the fourth input terminal IP4 of the second AND gate 155 may be connected to a feedback terminal (not shown) of the individual control part 270 described in FIG. 2. For example, the individual control part 270 may receive a sensing signal that senses an open state or a short state of the first light emitting diode 210 and the second light emitting diode 220 through the first sensing part 230 and the second sensing part 240, and may provide the received sensing signal to the fourth input terminal IP4 of the second AND gate 155. For example, the sensing signal may include a first sensing signal indicating that both the first light emitting diode 210 and the second light emitting diode 220 are in a normal state, and a second sensing signal indicating that at least one of the first light emitting diode 210 and the second light emitting diode 220 is in an abnormal state.

On the other hand, the second AND gate 155 may output a second control signal based on the power signal of the driving control part 130 input through the third input terminal IP3) and the state sensing signal of the light source part 110 input through the fourth input terminal IP4. For example, the second AND gate 155 may output a second control signal of a first level when the power signal of the driving control part 130 is input and the first sensing signal is input from the individual control part 270 of the light source part 110. In addition, the second AND gate 155 may output a control signal of a second level when the power signal of the driving control part 130 is not normally input or the second sensing signal is input from the individual control part 270 of the light source part 110. In addition, the second control signal of the first level or the second control signal of the second level may be provided to an input terminal of the first protective circuit part 140. For example, when the second control signal of the first level is output through the second AND gate 155, the fifth switching device Q5 of the first protective circuit part 140 may maintain a turn-on state. For example, when the second control signal of the second level is output through the second AND gate 155, the fifth switching device Q5 of the first protective circuit part 140 may be changed to a turn-off state.

As described above, the embodiment may sense various abnormal states of the light source driving apparatus through the abnormal state sensing part 150. In addition, the embodiment may stop the operation of the light source part 110 according to the sensing of an abnormal state through the first protective circuit part 140. Furthermore, the embodiment may sense the open state or short state of the light source part 110 based on the sensing signal sensed by the light source part 110, alternatively, may directly perform a protection operation corresponding to the open state of the light source part 110 through the first Zener diode ZD1. That is, as described above, the light source part 110 may or may not have an animation function. And, if the light source part 110 is not provided with an animation function, the light source part 110 does not include the above-described individual switches, sensing parts, and individual control parts. And, in this case, the first Zener diode (ZD1) is selectively turned on according to the voltage applied to the input terminal of the light source part 110, so that operations of the constant current driving part 120 and the light source part 110 may be stopped in an open state of the light source part 110.

Meanwhile, referring to FIG. 6, in the embodiment, the current or voltage applied to the light source part 110 may change according to the output of the first control signal and the second control signal. In FIG. 6, "A waveform" represents a magnitude of the current flowing in the light source part 110, "B waveform" represents the first control signal output from the first AND gate 154, and "C waveform" represents the second control signal output from the second AND gate 155.

For example, the embodiment may allow the first control signal CS1 to maintain a first level corresponding to the high level and the second control signal CS2 to maintain a second level corresponding to the high level in a first section TS1 between an initial time point TO and a first time point T1. In addition, when both the first control signal CS1 and the second control signal CS2 maintain a high level, the light source part 110 can be normally driven. In other words, when the light source part 110 is in a normal state and a power signal is normally input to the driving control part 130 and a clock signal is normally output from the driving control part 130, both the first control signal CS1 and the second control signal CS2 maintain a high level. Accordingly, the constant current driving part 120 operates normally under the above conditions, and accordingly, the constant current may be supplied to the light source part 110.

Meanwhile, in the embodiment, a level of the first control signal CS1 may change from a high level to a low level at a first time point T1. For example, an abnormality may occur in a power signal supplied to the driving control part 130 or a clock signal output from the driving control part 130 at the first time point T1. In this case, the first AND gate 154 may change the level of the first control signal to a second level (eg, low level). In this case, when the level of the first control signal CS1 is changed from the high level to the low level, an operation of the first protective circuit part 140 may be started. For example, the fifth switching device Q5 is turned off and the fourth switching device Q4 may be turned on as the level of the first control signal CS1 changes to a low level. Accordingly, the constant current driving part 120 may be changed to an off state, and accordingly, the light emitting operation of the light source part 110 may also be stopped. For example, the current may not be supplied to the light source part 110 during a second section TS2 between the first time point T1 and the second time point T2.

Meanwhile, in the embodiment, the level of the first control signal CS1 may be changed from a low level to a high level at the second time point T2. For example, a power signal not supplied to the driving control part 130 or a clock signal not output from the driving control part 130 at the second time point T2 may be restored to a normal state. In this case, the first AND gate 154 changes the level of the first control signal to a high level. In addition, the constant current driving part 120 starts operating again as the level of the first control signal changes to a high level, and the constant current may be supplied to the light source part 110 according to a control of the constant current driving part 120. Meanwhile, the light source part 110 may operate normally during a third section TS3 between the second time point T2 and the third time point T3 when both the first control signal and the second control signal maintain a high level.

Meanwhile, in the embodiment, the level of the second control signal CS2 may change from a high level to a low level at the third time point T3. For example, a power signal supplied to the driving control part 130 may not be normally supplied or an abnormal state may be sensed in the light source part 110 at the third time point T3. In this case, the second AND gate 155 may change the level of the second control signal to a second level (eg, low level). In this case, when the level of the second control signal CS2 is changed from the high level to the low level, an operation of the first protective circuit part 140 may be started. For example, the fifth switching device Q5 may be turned off and the fourth switching device Q4 may be turned on as the level of the second control signal CS2 changes to a low level. Accordingly, the constant current driving part 120 may be changed to an off state, and accordingly, the light emitting operation of the light source part 110 may also be stopped. For example, the current may not be supplied to the light source part 110 during a fourth section TS4 between the third time point T3 and the fourth time point T4.

Meanwhile, in the embodiment, the level of the second control signal CS2 may change from a low level to a high level at a fourth time point T5. For example, the power signal that was not supplied to the driving control part 130 may be supplied again at the fourth time point T4 or the light source part 110 may return to a normal state at the fourth time point T4. In this case, the first AND gate 154 changes the level of the first control signal from a low level to a high level. Then, the constant current driving part 120 starts operating again as the level of the first control signal changes to a high level, and the constant current may be supplied to the light source part 110 according to a control of the constant current driving part 120. Meanwhile, the light source part 110 may operate normally during a fifth section TS5 from the fifth time point T5 when both the first control signal and the second control signal maintain a high level to a time point when the level of the first control signal or the second control signal is changed.

FIG. 7 is a block diagram showing a configuration of a light source driving apparatus according to another embodiment, and FIG. 8 is a circuit diagram showing a light source driving apparatus shown in FIG. 7 in detail.

Referring to FIG. 7, a light source driving apparatus according to another embodiment includes a light source part 110, a constant current driving part 120, a driving control part 130, an abnormal state sensing part 150, and a second protective circuit part 160. In this case, the light source part 110, constant current driving part 120, driving control part 130, and abnormal state sensing part 150 shown in FIG. 7 are substantially the same as those shown in FIG. 1, and accordingly, the same reference numerals are assigned to them and detailed description thereof will be omitted.

The first protective circuit part 140 in FIG. 3 is disposed between the constant current input part 100a and the input terminal of the light source part 110 to control the operations of the constant current driving part 120 and the light source part 110.

Alternatively, the second protective circuit part 160 may be disposed at the output terminal of the light source part 110. The second protective circuit part 160 is connected to the abnormal state sensing part 150, and thus can receive a first control signal and a second control signal from the abnormal state sensing part 150. In addition, the second protective circuit part 160 is activated when the level of at least one of the first control signal and the second control signal is a second level (eg, low level), and so that the operations of the constant current driving part 120 and the light source part 110 may be stopped.

The second protective circuit part 160 includes a twelfth resistor R12, a thirteenth resistor R13, a fourteenth resistor R14, a second Zener diode ZD2, a sixth switching device Q6, a seventh switching device Q7 and an eighth switching device M1. The sixth switching device Q6 and the seventh switching device Q7 may be a transistor. Also, the eighth switching device M1 may be a Metal Oxide-Semiconductor Field Effect Transistor (MOSFET). For example, the eighth switching device M1 may be a P-type MOSFET, but is not limited thereto.

The twelfth resistor R12 has one end connected to the output terminal of the abnormal state sensing part 150 and the other end connected to the base terminal of the sixth switching device Q6 and one end of the second capacitor C2.

The thirteenth resistor R13 has one end connected to the output terminal of the light source part 110 and the other end connected to the collector terminal of the seventh switching device Q7 and the gate terminal of the eighth switching device M1.

The fourteenth resistor R14 has one end connected to the output terminal of the light source part 110 and the cathode terminal of the Zener diode ZD1, and the other end connected to the base terminal of the sixth switching device Q6 and the base terminal of the seventh switching device Q7.

The sixth switching device Q6 has a collector terminal connected to the base terminal of the seventh switching device Q7 and the other end of the fourteenth resistor R14, a base terminal connected to the other end of the twelfth resistor R12 and one end of the second capacitor C2, and an emitter terminal connected to a ground.

The seventh switching device Q7 has a collector terminal connected to the gate terminal of the eighth switching device M1, a base terminal connected to the collector terminal of the sixth switching device Q6, and an emitter terminal connected to a ground.

The eighth switching device M1 has a source terminal connected to the output terminal of the light source part 110, a gate terminal connected to the other end of the thirteenth resistor R13, the anode terminal of the second Zener diode ZD2, and the collector terminal of the switching device Q7, and a drain terminal connected to a ground.

The second Zener diode ZD2 has a cathode terminal connected to the output terminal of the light source part 110, one end of the thirteenth resistor R13 and one end of the fourteenth resistor R14, and an anode terminal connected to the collector terminal of the seventh switching device Q7 and the gate terminal of the eighth switching device M1.

One end of the second capacitor C2 is connected to the other end of the twelfth resistor R12 and the base terminal of the sixth switching device Q6, and the other end of the second capacitor C2 may be grounded.

The operation of the second protective circuit part 160 configured as described above is as follows.

The second protective circuit part 160 may receive a first control signal CS1 and a second control signal CS2 from the abnormal state sensing part 150. For example, as described above, the first control signal CS1 may include a first control signal of a first level and a first control signal of a second level. Also, the second control signal CS2 may include a second control signal of a first level and a second control signal of a second level.

In addition, the second protective circuit part 160 may be activated when the level of at least one of the first control signal CS1 and the second control signal CS2 is a second level (or low level), and accordingly, it is possible to stop the operation of the constant current driving part 120 and the light source part 110.

Meanwhile, when both the first control signal CS1 and the second control signal CS2 have a first level (or high level), the sixth switching device Q6 operates in a turn-on state, and the seventh switching device Q7 operates in a turn-off state and the eighth switching device M1 operates in a turn-off state. In this case, since the eighth switching device M1 is in a turn-off state, the constant current applied from the constant current input part 100a may be applied to each of the light source part 110 by the control of the constant current driving part 120.

Meanwhile, when the level of at least one of the first control signal CS1 and the second control signal CS2 is the second level (or low level), the sixth switching device (Q6) is changed to a turn-off state, and accordingly, the seventh switching device Q7 may be changed to a turn-on state. In this case, when the seventh switching device Q7 is turned on, the eighth switching device M1 may also be turned on in conjunction with it. In addition, the light source part 110 may operate in a short state as the eighth switching device M1 is turned on. For example, when the eighth switching device M1 is turned on, the anode and cathode ends of the light emitting diode consisting the light source part 110 are short-circuited. Accordingly, the current applied from the constant current input part 100a may flow through the eighth switching device M1 without being applied to the light source part 110. Accordingly, the light source part 110 may stop the lighting operation.

According to the above, the second protective circuit part 160 may stop the light emitting operation of the light source part 110 without changing the switching state of the switching device constituting the constant current driving part 120. This is because the second protective circuit part 160 is connected to the output terminal of the light source part 110 instead of the input terminal.

As described above, the embodiment may apply at least one protective circuit part of the first protective circuit part 140 and the second protective circuit part 160 based on the arrangement state of the light source part 110 consisting the light source driving apparatus, and may allow the lighting operation of the light source part 110 to be stopped.

For example, the light source part 110 is composed of a plurality of channels, and the plurality of channels may configure different lamps in a vehicle. For example, some of the plurality of channels consisting the light source part 110 may be applied to a taillight of a vehicle, others may be applied to a turn signal lamp, and the remaining others may be applied to a brake lamp.

In this case, the light source driving apparatus includes a plurality of circuit boards separated from each other, the plurality of light source parts 110 of the plurality of channels may be separately disposed on the plurality of circuit boards. In this case, the plurality of circuit boards may be interconnected through a connecting member such as a wire. Meanwhile, the first protective circuit part 140 may be disposed on a circuit board on which any one light source part among the plurality of light source parts is disposed. At this time, a control must be performed through a limited control pin in order to control the operation of the light source part disposed on another circuit board through the first protective circuit part, and this may cause a problem in operation reliability. Therefore, in the embodiment, at least one of the first protective circuit part 140 and the second protective circuit part 160 may be applied according to the arrangement state of the light source part 110, and it can control the operation of the light source part 110 using a protective circuit part.

FIG. 9 is a circuit diagram showing a light source driving apparatus according to another embodiment in detail.

Referring to FIG. 9, the light source driving apparatus includes a constant current input part 100a, a light source part 110, a constant current driving part 120, a driving control part 130, a first protective circuit part 140, an abnormal state sensing part 150 and a second protective circuit part 160.

That is, the light source driving device in the embodiment may include both the first protective circuit part 140 shown in FIG. 3 and the second protective circuit part 160 shown in FIG. 8. Therefore, in the embodiment, the control operation of the light source part 110 according to the situation may be performed using the first protective circuit part 140 and the second protective circuit part 160.

For example, the embodiment may control the operation of the light source part 110 using the first protective circuit part 140 under a first condition. In addition, the embodiment may control the operation of the light source part 110 using the second protective circuit part 160 under a second condition.

For example, the abnormal state sensing part 150 may include a first AND gate 154 and a second AND gate 155.

In addition, an output terminal of any one AND gate of the first AND gate 154 and the second AND gate 155 may be connected to the first protective circuit part 140. Also, an output terminal of the other AND gate of the first AND gate 154 and the second AND gate 155 may be connected to the second protective circuit part 160. For example, the first protective circuit part 140 may be connected to an output terminal of the first AND gate 154. In addition, the second protective circuit part 160 may be connected to an output terminal of the second AND gate 155. In this case, the first control signal CS1 output from the first AND gate 154 may be input to the first protective circuit part 140. In addition, the second control signal CS2 output from the second AND gate 155 may be input to the second protective circuit part 160. Accordingly, the first protective circuit part 140 may receive a first control signal of a first level or a first control signal of a second level output from the first AND gate 154. In addition, the first protective circuit part 140 may be activated when the first control signal of the second level is received to stop the operation of the constant current driving part 120 and the light source part 110. In addition, the second protective circuit part 160 may receive a second control signal of a first level or a second control signal of a second level output from the second AND gate 155. And, the second protective circuit part 160 may be activated when the second control signal of the second level is received to short the light source part 110, and may control current to flow via the eighth switching device M1.

The embodiment can improve an operational reliability of the light source part. For example, an embodiment may include a first protective circuit part disposed on an input terminal of a light source part. The first protective circuit part operates when an abnormal state of the light source part, an abnormal state of power supplied to the driving control part, and an abnormal state of a clock signal provided from the driving control part are sensed to stop a light emitting operation of the light source part. Accordingly, the embodiment can solve the reliability problem that may occur as the light source part continues to operate in various abnormal states as described above, and can protect each component circuit consisting the light source driving apparatus.

FIG. 10 is a top view of a vehicle to which a lamp having a light source driving apparatus according to an embodiment is applied, FIG. 11 is an example in which a light source driving apparatus according to an embodiment is disposed at a front of a vehicle, and FIG. 12 is an example in which a light source driving apparatus according to an embodiment is disposed at a rear of a vehicle.

Referring to FIGS. 10 to 12, the lighting driving device according to the embodiment may be applied to a lamp of a vehicle 2000. One or more lamps may be disposed on at least one of front, rear, and side surfaces of the vehicle 2000. The lighting driving device may be provided in various shapes such as a curve or a straight line, and may be applied to lamps disposed in various areas of the vehicle 2000.

For example, referring to FIG. 11, the lamp may be applied to a front lamp 2100 of a vehicle 2000. The front lamp 2100 may include at least one lamp module including a first cover member 2110 and the lighting device 1000. The first cover member 2110 may accommodate the lighting driving device.

The front lamp 2100 may provide a plurality of functions by controlling a driving timing of a lighting driving device included in at least one lamp module. For example, the front lamp 2100 may include a first lamp module 2120 and a third lamp module 2130 that provide at least one function of a head lamp, a turn signal lamp, a daytime running lamp, a high lamp, a low lamp, and a fog lam, by light emission of the light source part 110 of the light driving device. In addition, the front lamp 2100 may provide additional functions such as a welcome lamp or a celebration effect when the driver opens the vehicle door.

In addition, referring to FIG. 12, the lamp may be applied to a rear lamp 2200 of a vehicle. The rear lamp 2200 may include at least one lamp module including a second cover member 2210 and the lighting driving device. The second cover member 2210 may accommodate the lighting driving device.

The rear lamp 2200 may provide a plurality of functions by controlling the driving timing of a light source part included in at least one lamp module. For example, the rear lamp 2200 includes a second lamp module 2220 that provides at least one function of a side lamp, a brake lamp, and a turn signal lamp by emitting light of the light source part 110 of the light source driving apparatus.

The embodiment can improve an operational reliability of the light source part. For example, an embodiment may include a first protective circuit part disposed on an input terminal of a light source part. The first protective circuit part operates when an abnormal state of the light source part, an abnormal state of power supplied to the driving control part, and an abnormal state of a clock signal provided from the driving control part are sensed to stop a light emitting operation of the light source part. Accordingly, the embodiment can solve the reliability problem that may occur as the light source part continues to operate in various abnormal states as described above, and can protect each component circuit consisting the light source driving apparatus.

The characteristics, structures, effects, and the like described in the above-described embodiments are included in at least one embodiment, but are not limited to only one embodiment. Furthermore, the characteristic, structure, and effect illustrated in each embodiment may be combined or modified for other embodiments by a person skilled in the art. Therefore, it should be construed that contents related to such combination and modification are included in the scope of the embodiment.

Embodiments are mostly described above, but the embodiments are merely examples and do not limit the embodiments, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the embodiment defined in the following claims.

The invention claimed is:

1. A light source driving apparatus comprising:
    a light source part;
    a constant current driving part connected to the light source part, including a first switching device, and supplying a constant current to the light source part according to a switching operation of the first switching device;
    a driving control part outputting a switching signal for controlling the first switching device of the constant current driving part;
    an abnormal state sensing part sensing an abnormal state of the light source part and an abnormal state of the driving control part, and outputting a control signal according to a result of the sensing; and
    a protective circuit part selectively operating based on the control signal output from the abnormal state sensing part to stop an operation of the constant current driving part and an operation of the light source part,
    wherein the abnormal state sensing part includes an AND gate for receiving a plurality of state signals corresponding to the light source part and the driving control part and outputting a control signal based on the received plurality of state signals.

2. The light source driving apparatus of claim 1, wherein the protective circuit part includes at least one of a first protective circuit part connected to an input terminal of the light source part and a second protective circuit part connected to an output terminal of the light source part.

3. The light source driving apparatus of claim 2, wherein the first protective circuit part includes:
a second switching device connected to the abnormal state sensing part and performing a switching operation according to the control signal output from the abnormal state sensing part; and
a third switching device connected to the second switching device and performing a switching operation according to a switching operation of the second switching device.

4. The light source driving apparatus of claim 3, wherein the second switching device includes:
a first base terminal connected to the abnormal state sensing part;
a first collector terminal connected to the input terminal of the light source part; and
a first emitter terminal connected to a ground;
wherein the third switching device includes:
a second base terminal connected to the first collector terminal of the second switching device;
a second collector terminal connected to the base terminal of the first switching device; and
a second emitter terminal connected to a ground.

5. The light source driving apparatus of claim 4, wherein the second switching device is turned on when the control signal is at a first level and turned off when the control signal is at a second level,
wherein the third switching device is turned off when the control signal is at the first level and turned on when the control signal is at the second level, and
wherein the first switching device maintains a turn-off state when the third switching device is in a turn-on state.

6. The light source driving apparatus of claim 4, wherein the first protective circuit part includes a first Zener diode having a first cathode terminal connected to the input terminal of the light source part and an anode terminal connected to the second base terminal of the third switching device.

7. The light source driving apparatus of claim 6, wherein the first Zener diode is turned on when a second voltage higher than a first voltage is applied to the input terminal of the light source part,
wherein the third switching device is changed to a turn-on state in response to the turn-on of the first Zener diode, and
wherein the first switching device maintains a turn-off state when the third switching device is in a turn-on state.

8. The light source driving apparatus of claim 2, wherein the second protective circuit part includes:
a fourth switching device connected to the abnormal state sensing part and performing a switching operation according to the control signal output from the abnormal state sensing part;
a fifth switching device connected to the fourth switching device and performing a switching operation according to a switching operation of the fourth switching device; and
a sixth switching device connected to the fifth switching device and performing a switching operation according to a switching operation of the fifth switching device.

9. The light source driving apparatus of claim 8, wherein the fourth switching device includes:
a third base terminal connected to the abnormal state sensing part;
a third collector terminal connected to the fifth switching device; and
a third emitter terminal connected to a ground,
wherein the fifth switching device includes:
a fourth base terminal connected to the third collector terminal of the fourth switching device;
a fourth collector terminal connected to the output terminal of the light source part and the sixth switching device; and
a fourth emitter terminal connected to a ground,
wherein the sixth switching device includes:
a source terminal connected to the output terminal of the light source part;
a gate terminal connected to the fourth collector terminal of the fifth switching device; and
a drain terminal connected to a ground.

10. The light source driving apparatus of claim 9, wherein the fourth switching device is turned on when the control signal is at a first level and turned off when the control signal is at a second level,
wherein the fifth switching device is turned off when the control signal is at the first level and turned on when the control signal is at the second level,
wherein the sixth switching device is turned off when the control signal is at the first level and turned on when the control signal is at the second level,
wherein when the sixth switching device is in a turn-on state, a current applied to the light source part flows through a path passing through the sixth switching device.

11. The light source driving apparatus of claim 2, wherein the AND gate includes:
a first AND gate for receiving a first state signal and a second state signal and outputting a first control signal according to the first and second state signals; and
a second AND gate for receiving the first state signal and a third state signal and outputting a second control signal according to the first and third state signals.

12. The light source driving apparatus of claim 11, wherein the first state signal is a state signal of a power supplied to the driving control part,
wherein the second state signal is a state signal of a clock signal output from the drive control part, and
wherein the third state signal includes a state signal corresponding to the open state or short state of the light source part.

13. The light source driving apparatus of claim 11, wherein the first AND gate outputs the first control signal to one of the first protective circuit part and the second protective circuit part, and
wherein the second AND gate outputs the second control signal to the other one of the first protective circuit part and the second protective circuit part.

14. The light source driving apparatus of claim 12, wherein when a level of at least one of the first control signal and the second control signal changes from a high level to a low level, the first protective circuit part is activated to change the constant current driving part to an off state.

15. The light source driving apparatus of claim 12, wherein when the level of at least one of the first control signal and the second control signal changes from a high level to a low level, the second protective circuit part is activated to change the constant current driver to an off state.

* * * * *